United States Patent [19]

Bales et al.

[11] Patent Number: 5,473,367
[45] Date of Patent: Dec. 5, 1995

[54] VIDEO VIEW SELECTION BY A CHAIRPERSON

[75] Inventors: Bruce M. Bales, Louisville; Ted M. Fidder, Broomfield, both of Colo.; John G. Fijolek, Naperville, Ill.; Donald D. Gallagher, Boulder, Colo.; Robert L. Lien, Batavia, Ill.; Stephen M. Thieler, Boulder, Colo.; Vojislav V. Vucetic, Holmdel, N.J.

[73] Assignee: AT&T Corp., Murray Hill, N.J.

[21] Appl. No.: 85,997

[22] Filed: Jun. 30, 1993

[51] Int. Cl.⁶ .................... H04N 7/14; H04N 7/15
[52] U.S. Cl. .................. 348/16; 348/15; 379/96; 379/94
[58] Field of Search ................ 348/14, 15, 16, 348/13; 379/96, 94, 93, 202, 203, 204, 205, 206; H04N 7/14, 7/15

[56] References Cited

U.S. PATENT DOCUMENTS

| 4,531,024 | 7/1985 | Colton et al. | 348/15 |
|---|---|---|---|
| 4,635,251 | 1/1987 | Stanley et al. | 370/62 |
| 4,653,090 | 3/1987 | Hayden | 379/204 |
| 4,691,347 | 9/1987 | Stanley et al. | 379/203 |
| 4,769,833 | 9/1988 | Farleigh et al. | 379/105 |
| 4,931,872 | 6/1990 | Stoddard et al. | 358/183 |
| 4,953,159 | 8/1990 | Hayden et al. | 379/96 |
| 4,995,071 | 2/1991 | Weber et al. | 348/15 |
| 5,003,532 | 3/1991 | Ashida et al. | 348/15 |
| 5,113,431 | 5/1992 | Horn | 379/94 |
| 5,176,520 | 1/1993 | Hamilton | 348/13 |
| 5,195,086 | 3/1993 | Baumgartner et al. | 379/202 |

FOREIGN PATENT DOCUMENTS

0400668 12/1990 European Pat. Off. ......... H04N 7/15
4207286 7/1992 Japan ....................... H04N 7/14

OTHER PUBLICATIONS

Tanigawa et al., *Personal Multimedia-Multipoint Teleconference System*, IEEE INFOCOM '91—The Conference on Computer Communications, vol. 3, Apr. 7, 1991, pp. 1127–1134.

Robinson, et al., *A Multimedia Interactive Conferencing Application for Personal Workstations*, IEEE Transactions on Communications, vol. 39, No. 11, Nov. 1991, pp. 1698–1708.

W. J. Clark, *Multipoint Multimedia Conferencing*, IEEE Communications Magazine, vol. 30, No. 5, May 1992, pp. 44–50.

*Primary Examiner*—Curtis Kuntz
*Assistant Examiner*—Stella L. Woo
*Attorney, Agent, or Firm*—John C. Moran

[57] ABSTRACT

A switching system for allowing any one conferee on a video conference to assume the role of manually manipulating the video picture that will be seen by all conferees (chair view). In addition, each individual conferee is allowed to determine their own video picture content or to select the chair view. Further, anyone of conferees can assume the role of determining the chair view. In addition, for the video classroom, a chair view video picture is composed such that the picture displays the visual aid with an insert for an instructor and an insert for a student asking a question. Further, the instructor selects by using a button or mouse which student is to be displayed in the student insert, and the video picture automatically displays that student. In another embodiment of the system, the students request permission to ask a question by actuation of a switch on their telephone set, and the names of students asking questions are displayed on a computer display screen. The instructor then can select the student by manipulating the cursor on the computer display to select the desired student.

50 Claims, 11 Drawing Sheets

FIG. 2   MESSAGE FLOW

VIDEO VIEW SELECTION BY A CHAIRPERSON

TECHNICAL FIELD

This invention relates to communication systems and, in particular, to a telecommunication switching system providing video conferencing capabilities.

BACKGROUND OF THE INVENTION

In present video conferences, a video picture seen by the conferees may be displayed in the following ways: show all the conferees, show the conferee that is talking, or show all the conferees with the talking conferee highlighted. In addition, it is known where a video conference is being conducted between two specially equipped conference rooms to allow the conferees in one conference room to control the video camera in the other conference room so as to be able to point that camera at various people or objects in the other conference room. Also, it is known where each conferee has a split screen and can select the pictures of the other conferees to be displayed in the split screen.

The problem with these capabilities is that often the video picture seen by the conferees should include a visual aid, e.g., view graph, plus the individual who is giving the presentation or the individual who is asking a question. This problem often arises where classes are being taught by video or during video business conferences. In addition, it is desirable that one individual be able to control the video picture seen by the other conferees and to compose this picture by including people or visual aids. Further, in the business conference, it is desirable for different individuals to control the video picture seen by other conferees as the topic of the business conference change. Also, each conferee needs the ability to control their own picture if they desire. In addition, in the classroom situation, it is desirable to automate the process whereby students ask questions and are displayed in the video picture.

SUMMARY OF THE INVENTION

The foregoing problems are solved, and a technical advance is achieved by a system and method which allows one of the conferees on the conference to assume the role of manually manipulating the content of a video picture that will be seen by all conferees (chair view). In addition, each individual conferee is allowed to determine their own video picture content or to select the chair view. These capabilities provide the reality of a virtual meeting room and allow other conferees to be freed of manipulating their own video picture content. Further, anyone of conferees can assume the role of determining the chair view which allows control of chair view to shift as the principal speaker of the video conference shifts.

In addition, for the video classroom, a video picture is composed such that the picture displays the visual aid with an insert for an instructor and an insert for a student asking a question. Further, the instructor selects by using a button or mouse which student is to be displayed in the student insert, and the video picture automatically displays that student. In another embodiment of the system, the students request permission to ask a question by actuation of a switch on their telephone set, and the names of students asking questions are displayed on a computer display screen. The instructor then can select the student by manipulating the cursor on the computer display to select the desired student. Advantageously, all control information may be communicated using the standard ISDN protocol.

DETAILED DESCRIPTION

Figure 1:
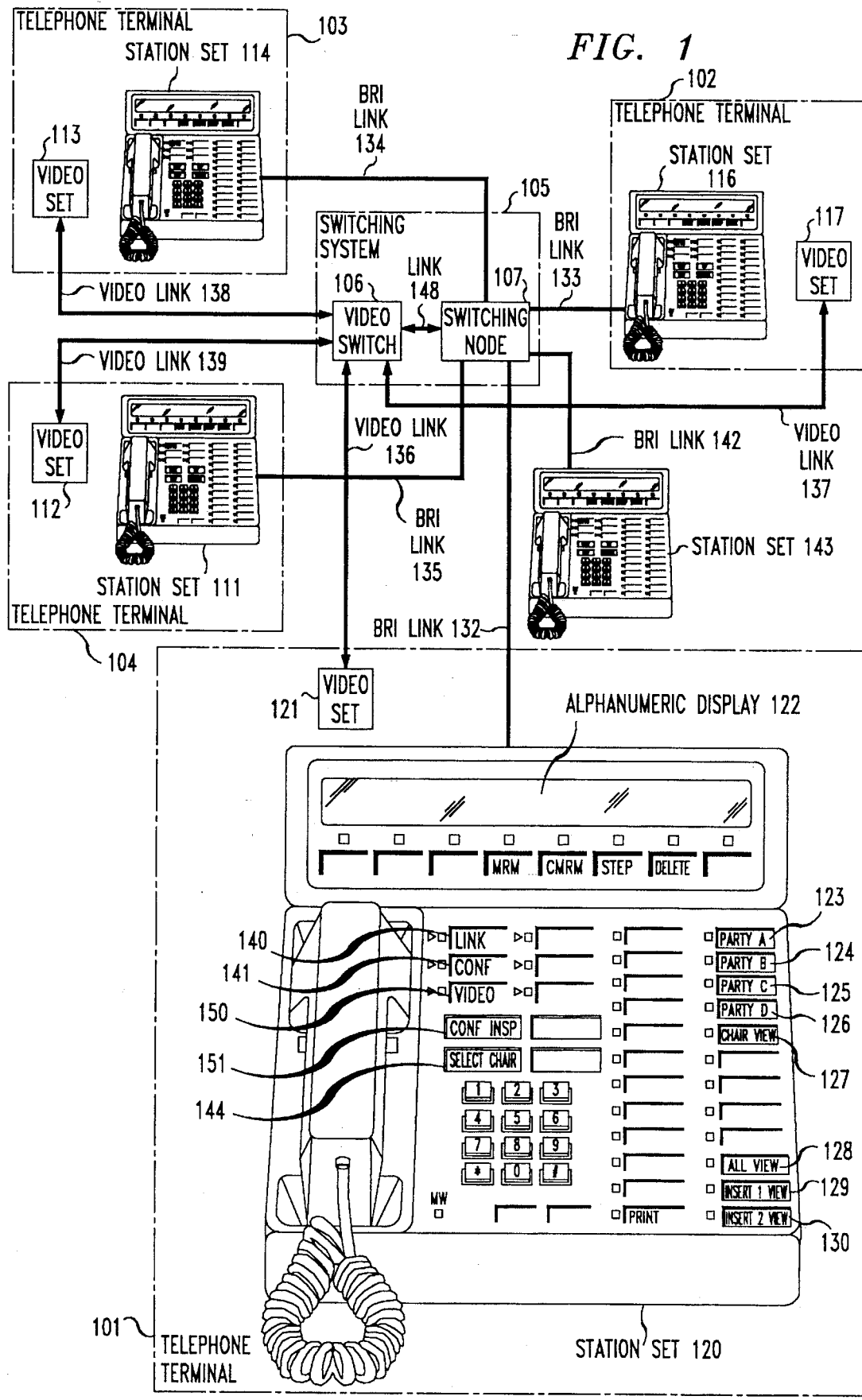
FIG. 1 illustrates, in block diagram form, a system for implementing the invention.

In block diagram form, FIG. 1 illustrates one embodiment for implementing the present invention. Telephone terminals 101 through 104 each comprise a station set and a video set. Station sets 111, 114, and 116 are identical to station set 120. Similarly, video sets 112, 113, 117, and 121 are the same. Each video set includes a video display, video camera, and audio devices. Station set 143 has no associated video set; hence, a user of station set 143 has only audio communication. While a video conference is in process, both video and audio information is communicated via the video sets. Switching system 105 controls the switching of audio and video information. Control information is transmitted to and from the station sets via BRI links 132 through 135. Switching node 105 utilizes the control information received via the BRI links to control video switch 106 and also to control the conferencing of the audio information. Audio information is transmitted from the video sets via video links 136 through 139. The audio information received by video switch 106 is conferenced together and transferred back to the video sets.

Figure 3:
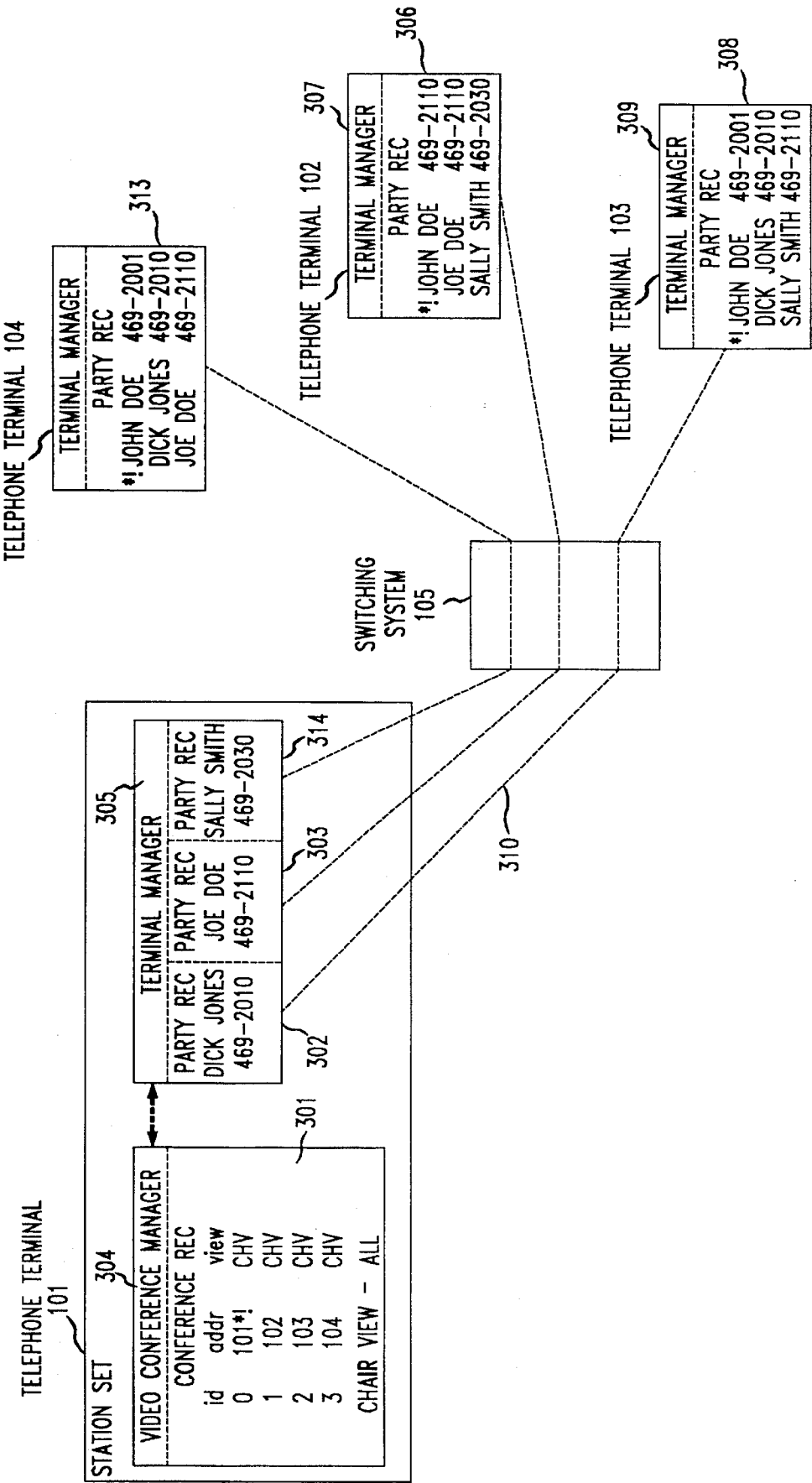
FIGS. 3 and 4 illustrate the software records that are created during a video conference.

The internal structure of switching node 107 is described in greater detail with respect to FIG. 3 and in U.S. Pat. No. 5,182,750. In addition, the software architecture is also described in the latter U.S. patent.

Each telephone terminal has associated with it a terminal management software application. The terminal management applications are executing either on the computer controlling switching node 107 or within each of the station sets. The terminal management application controlling a video conference is the terminal management application of the station set that originated the video conference call. The controlling terminal management application communicates with the other terminal management applications utilizing standard ISDN protocol messages. These messages are switched via switching node 107.

Using a telephone terminal, such as telephone terminal 101, a user can establish a video conference and determine the chair view by designating themselves as the chairperson. In addition, any user on the video conference can select to look at any one of the parties on the conference, all the parties simultaneously, chair view, or an insert view which allows a fixed number of parties to be displayed. To understand how these different functions are performed consider the following examples. In a first example, the user of telephone terminal 101 establishes a video telephone call by depressing line button 140 and video button 150. The user then dials the telephone number of another telephone terminal which in the present example is assumed to be telephone terminal 102. Since telephone terminal 101 is indicating to switching node 107 via BRI link 132 that the call is to be a video call, switching node 107 alerts station set 116 to this fact and sets up the necessary video connection through video switch 106. After a call has been established between telephone terminal 101 and telephone terminal 102, the user of telephone terminal 101 then utilizes conference button 141 to bring telephone terminals 103 and 104 into a video conference. Each of the telephone terminals is assigned to buttons 123 through 126 as each is joined onto the telephone call. In the present example, party A is telephone terminal 101, and party B is telephone terminal 102. By default, all telephone terminals display the all-view picture until a user selects another view.

In addition, station set 143, which has no associated video set, can be part of the audio portion of the video conference. Greater detail on how station set 143 can be pan of the video conference is given with respect to FIGS. 11 and 12.

To designate the chair view, the user of telephone terminal 101 first actuates select chair button 144 and then the appropriate button to designate the picture content. For example, if the user of telephone terminal 101 wants to display all of the parties on the conference for the chair view, the user actuates all-view button 128 after actuating select chair button 144. When select chair button 144 is first actuated, an indicator light, that is located with select chair button 144, is turned on to indicate that the telephone terminal is specifying the chair view. Telephone terminal 101 will continue to specify the chair view until select chair button 144 is actuated a second time which also turns off the indicator light. While the indicator light is on, any view selected by the user of telephone terminal 101 becomes the chair view.

In another implementation of chair view designation, the user of telephone terminal 101 first actuates select chair button 144 and then the appropriate button or buttons to designate the picture content. After the user has designated the picture content, subsequent picture selections by the user do not change the chair view but rather only effect the picture displayed on telephone terminal 101. In order to change the chair view again, the user of telephone terminal 101 must first actuate the select chair button 144 before making a picture selection.

The insert view consists of a larger picture having one or two smaller pictures inserted into the larger picture. To select an insert view, the user of telephone terminal 101 first selects the view that is to be the larger picture by actuation of the appropriate button and then actuates insert 1 button 129 followed by the actuation of the button which designates the picture to be placed in the first insert. If the user desires two inserts, the user actuates insert 2 button 130 followed by the actuation of the button which designates the picture to be placed in the second insert. The user can change either inserts any time by actuation of either insert 1 button 129 or insert 2 130 followed by actuation of the button designating the desired picture. An insert is removed from the video set by actuating the appropriate insert button twice without designation of a picture between the two actuations. If telephone terminal 101 is specifying the chair view during the actuation of the insert buttons, the resulting picture will be the chair view. Those skilled in the art could readily envision methods for having more than two inserts. For example, if the picture from telephone terminal 102 is to be the large picture and the pictures from telephone terminals 103 and 104 are to be the inserts, the user of telephone terminal 101 actuates party B button 124, insert 1 button 129, party C button 125, insert 2 button 130 and party D button 126 in that order. This results in the desired insert view being configured.

During the video conference, the users of the telephone terminals can select the various pictures they wish to see. For example, the user of telephone terminal 101 can select any of the parties, the chair view, and the all party view, by actuations of buttons 123 through 128.

Figure 2:
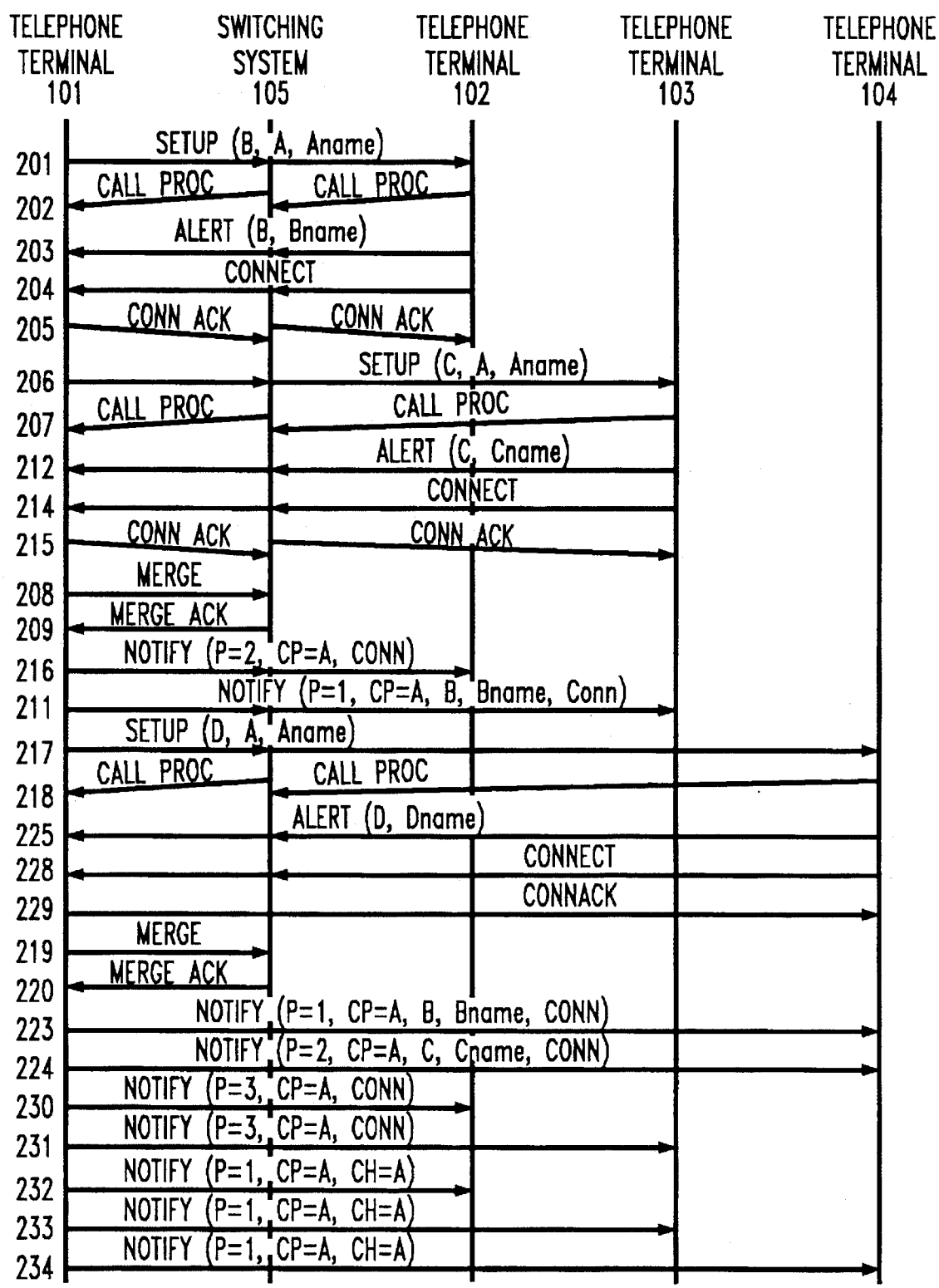
FIG. 2 illustrates the message flow for creating a video conference in accordance with the invention.

FIG. 2 illustrates the message flow utilized to set up a video conference call by telecommunication terminal 101. The setup message of line 201 which is transmitted from telecommunication terminal 101 to telecommunication terminal 102 via switch 105 specifies to switch 105 that a video call is being setup. Lines 202 through 205 complete this video call between telecommunication terminal 101 and telecommunication terminal 102. In line 206, telecommunication terminal 101 transmits a second setup message to telecommunication terminal 103 which also specifies a video call. In line 208, telecommunication terminal 101 transmits a merge message to switch 105 requesting that switch 105 form a video conference call between telecommunication terminals 101,102, and 103. Switch 105 is responsive to the merge message of line 208 to default to the all-view format. The notify messages of fines 211, 213, and 216 are utilized to inform the various station sets of the identity of parties on the video conference. In line 217, telecommunication terminal 101 transmits a setup message via switch 105 to telecommunication terminal 104. On obtaining the connect message of line 228, telecommunication terminal 101 transmits the connect acknowledge message of line 229 and a merge message in line 219 to switch 105 requesting that telecommunication terminal 104 be merged into the video conference call. The messages of lines 223, 224, 230, and 23 1 complete the transfer of information to the various telecommunication terminals. Note, that the designations A, B, C, and D, refer to telecommunication terminals 101 through 104, respectively.

Figure 5:
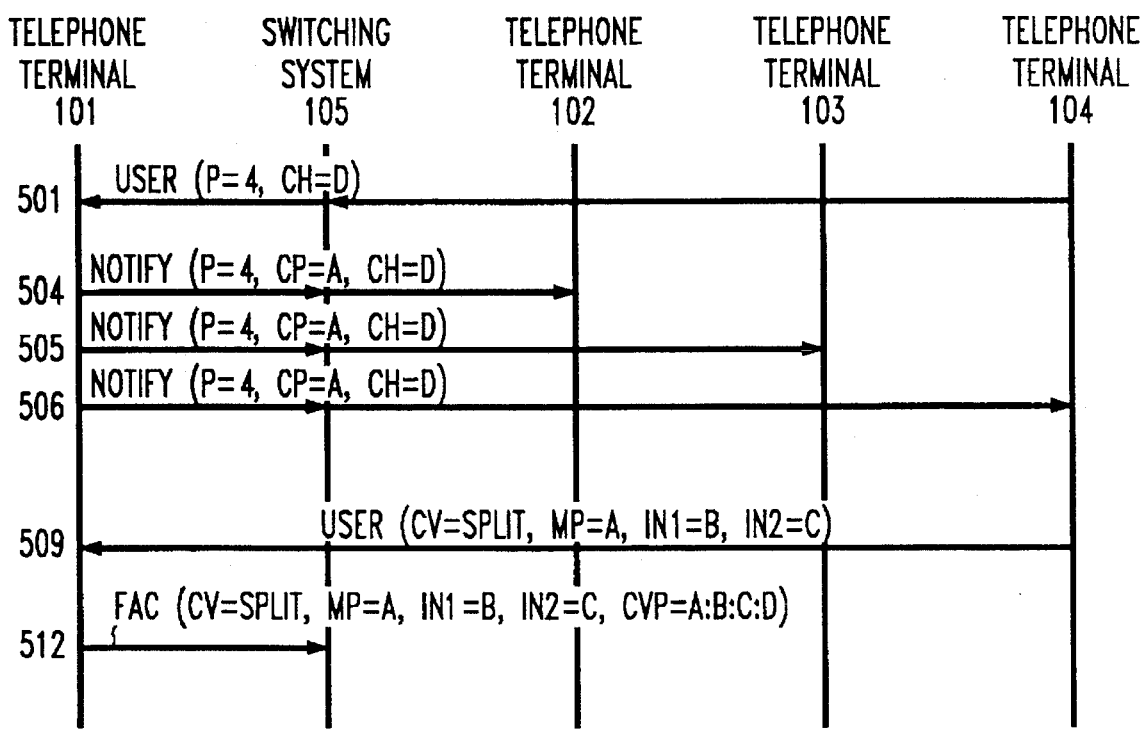
FIG. 5 illustrates message flow for a telephone terminal selecting the chair view in accordance with the invention.

After the video conference has been established, the user of telephone terminal 101 actuates the chair view button 127. Telephone terminal 101 transmits the notify messages of lines 232, 233, and 234 to inform telephone terminals 102, 103, and 104 that telephone terminal 101 is controlling the chair view. The telephone terminal, that is the chairperson, is defined by the "CH" portion of the notify message. Video switch 106 defaults to the all view picture, when a video conference is initially set up. FIG. 5 illustrates the message flow when terminal telephone 104 becomes the chairperson. Telephone terminals 102 and 103 would cause a similar message flow if they become chairperson.

FIG. 3 illustrates the records which have been set up in telecommunication terminals 10 1 through 104 in response to the messages of FIG. 2. The records and managers are located in the highest software layer, the application layer, of the software structure of the station sets. As is described in greater detail later, the terminal manager application invokes the video conference manager application upon actuation of the conference button subsequent to the actuation of the video button. Each terminal manager application maintains a party record for each half of the call in which the terminal manager application is involved. Each party record contains a record of the names of users and addresses (telephone numbers) of the parties on the other half of the call. For example, party records 302, 303, and 314 contain the names and telephone numbers of the users of telecommunication terminals 102, 103, and 104, respectively. Telecommunication terminals 102, 103, and 104 reflect in their party records (306, 308, and 313, respectively) the telecommunication terminal that is the controlling telecommunication terminal and the sub-party telecommunication terminals. In party record 306, the name and telephone number for station set 101 have an asterisk before them denoting the controlling party. Similarly, the party records also reflect which station set (chairperson) is controlling the chair view by placing an exclamation mark. For example, in party record 306 the name and telephone number for telecommunication terminal 101 have an exclamation mark before them denoting the chair person.

FIG. 3 only illustrates the logical message channels (such as logical channel 310) that are established between the telecommunication terminals via the switches. These logical channels allow the communication of messages between terminal managers. The manner in which these logical channels are established is set forth in the above referenced U.S. patent. More information on how the conference record and party records are built is given in a U.S. patent application entitled "Telephone Terminal Controlled Conference Inspection", Ser. No. 07/996,350, filed Dec. 23, 1992, and assigned to the sane assignee as the present application.

Figure 4:
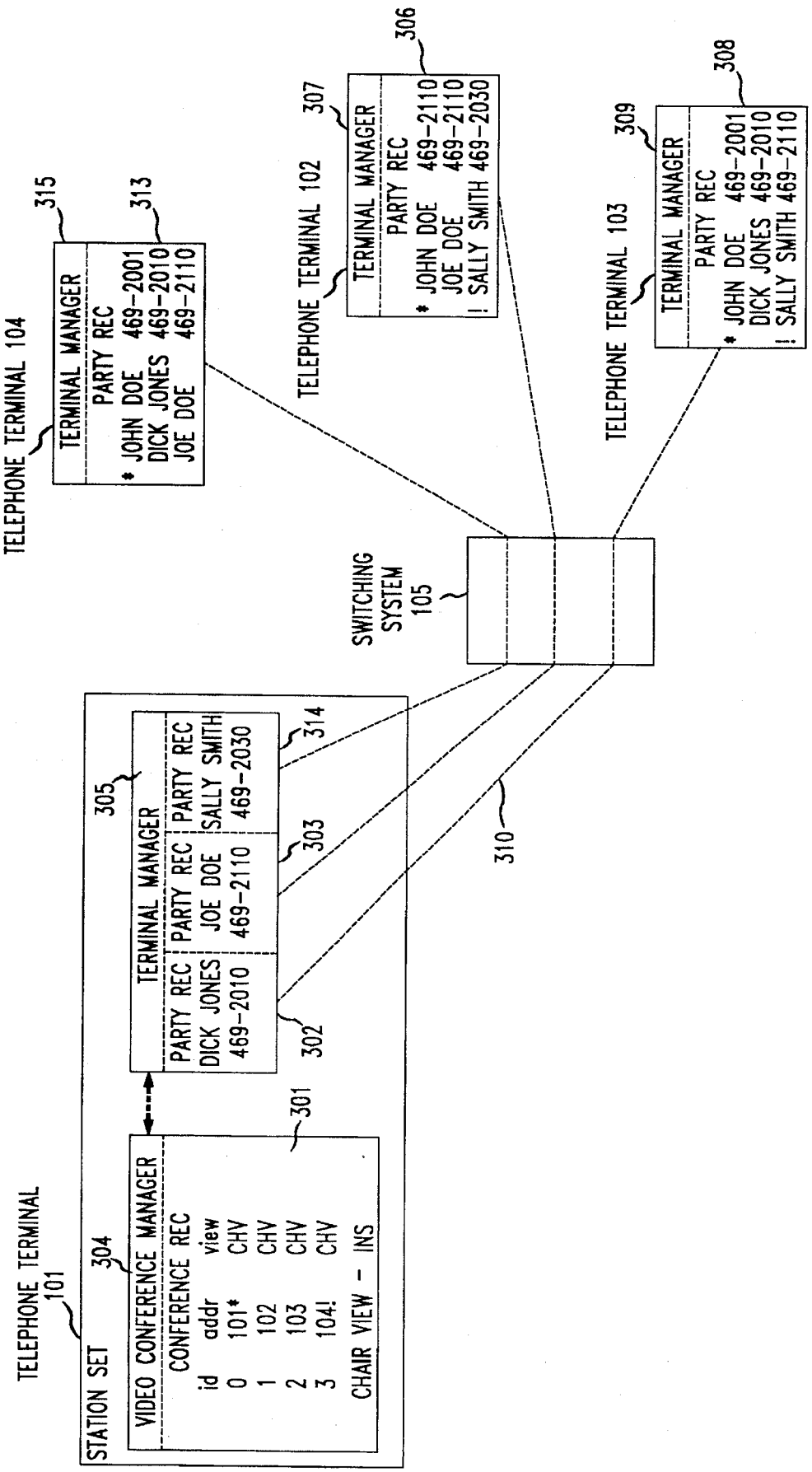

To further understand the functions, consider now the situation where the user of telecommunication terminal 104 actuates the select chair button, party A button, insert 1 button, party B button, insert 2 button, and party C button. The result is that the user of telephone terminal 104 is now the chair person and the chair view has been changed to an insert view with party A as the main picture and parties B and C as insert pictures. To achieve this result, the terminal manager of telephone terminal 104 transmits the user information message of line 501 of FIG. 5 to terminal manager 305 of telephone terminal 101. This user information message informs terminal manager 305 in telephone terminal 104 that telephone terminal 104 is to determine the chair view. Terminal manager 305 is responsive to this information to update video conference record 301 as illustrated in FIG. 4 and to transmit the notify messages of lines 504 and 505 of FIG. 5 to telephone terminals 102 and 103 so that telephone terminals can update their information with respect to the chair person. The notify message of line 506 confirms to telephone terminal 104 that it is controlling the chair view. These updates are also illustrated in FIG. 4. Terminal manager 315 of telephone terminal 104 responds to the notify message of line 506 by transmitting the user information message of line 509 which informs terminal manager 305 that chair view is to be that described at the beginning of this paragraph. In response to the user information message of line 509, terminal manager 305 transmits to switching system 105 the facility message of line 512. In response, switching system 105 sets up the requested chair view. The manner in which switching system 105 responds to that user information message is described with respect to FIGS. 11 and 12.

Figure 7:
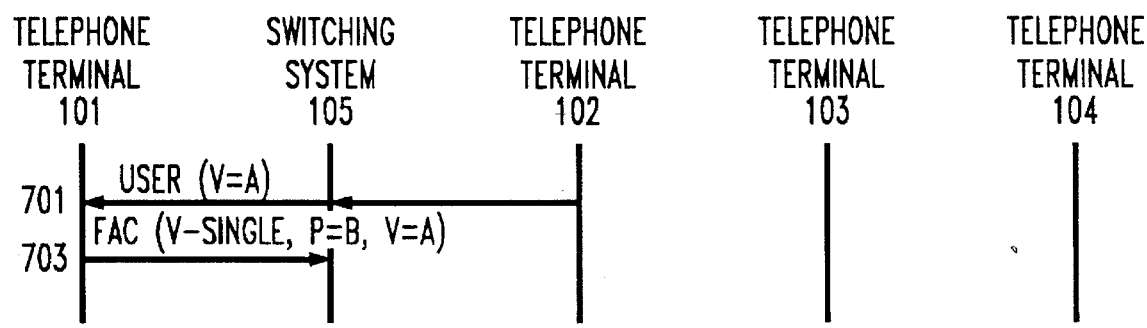
FIG. 7 illustrates message flow for a telephone terminal selecting its own view in accordance with the invention.
Figure 6:
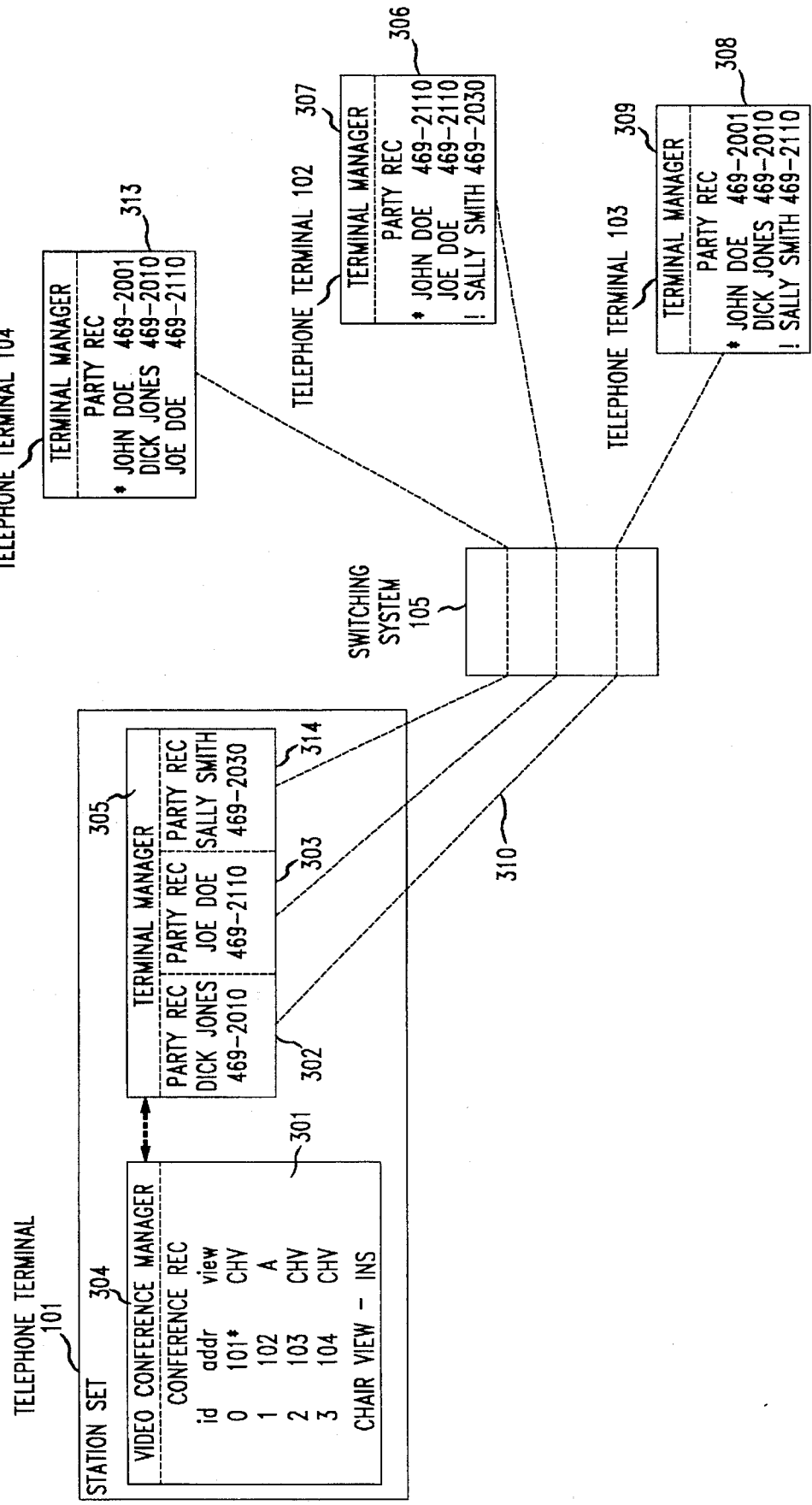
FIG. 6 illustrates software records that are created during a video conference.

Assume now that the user of telephone terminal 102 does not want to see the chair view selected by telephone terminal 104 but rather wishes to see only the user of telephone terminal 10 1. To accomplish this, the user of telephone terminal 102 actuates the party A button on station set 116. As illustrated in line 701 of FIG. 7, terminal manager 307 of terminal 102 transmits a user information message to terminal manager 305 of telephone terminal 101 requesting only the picture of party A. Terminal manager 305 of telephone terminal 101 is responsive to the user information message to modify conference record 301 as illustrated in FIG. 6. Terminal manager 305 transmits the facility message of line 703 to have only the picture from telephone terminal 101 switched to telephone terminal 102.

Figure 8:
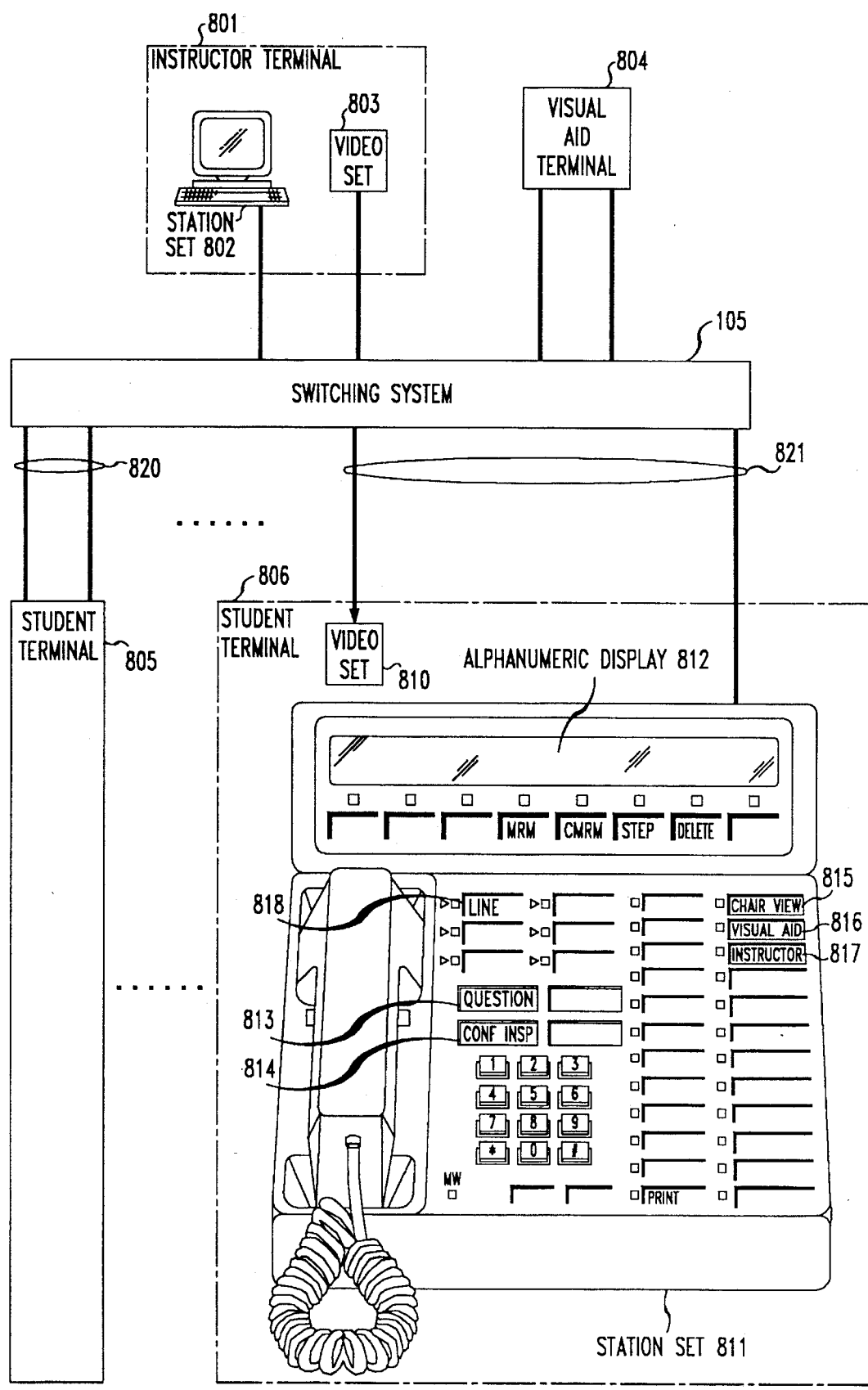
FIG. 8 illustrates, in block diagram form, a system :for implementing another embodiment of the invention.

FIG. 8 illustrates, in block diagram form, a system for implementing a video classroom in accordance with the invention. Each student who is located at a remote site is equipped with a student terminal such as student terminal 806. Student terminal 806 gives the student the ability to send a signal that the student has a question to instructor terminal 801 by actuation of question button 813. Student terminal 806 does not provide the capability for the student to become the chairperson. The student has the option of three views by actuation of buttons 815 through 817. Student terminal 805 through 806 are interconnected to switching system 105 by links 820 through 821. It is well known in the art that links 820 through 821 could be switched through the public telephone network. Visual aid terminal 804 consists of only a video camera and is utilized to display the blackboard, etc. that is being utilized by the instructor. Instructor terminal 801 utilizes station set 802 to provide the instructor with the necessary capability for running a video class.

Using methods well known in the art, the terminal manager of station set 802 is responsive to actions by the user on keyboard 906 and mouse 907 to convert those actions to stimuli for the video conference manager.

Figure 9:
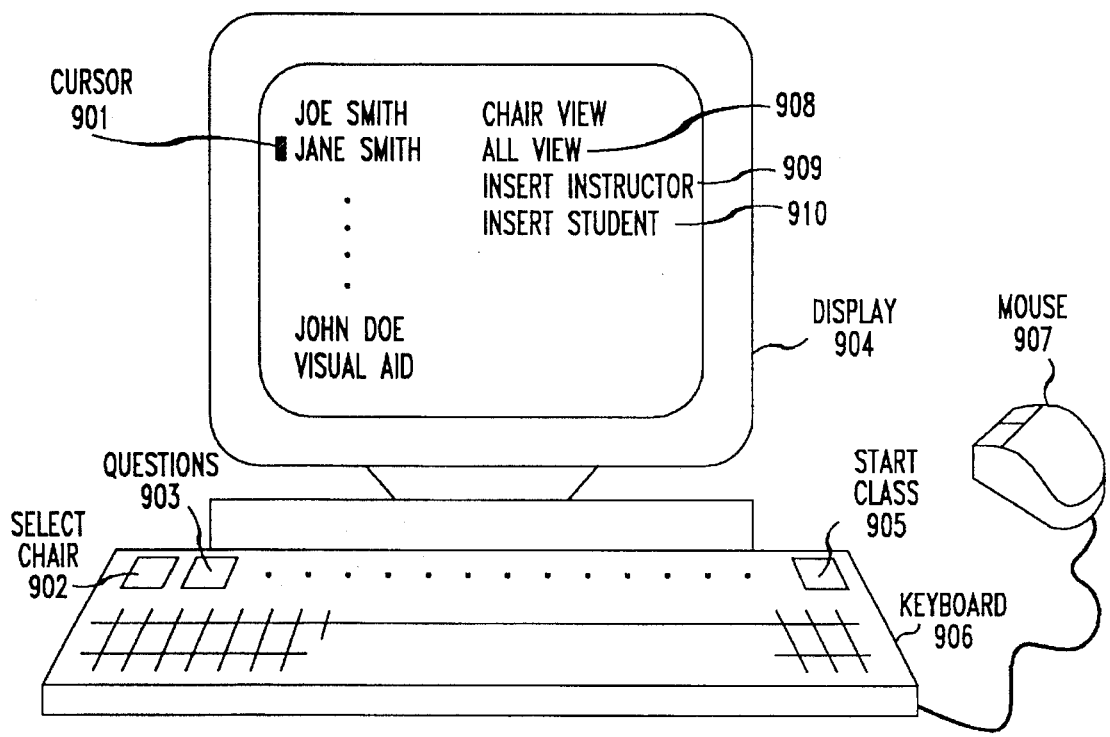
FIGS. 9 and 10 illustrate an instructor terminal during (different stages of a video conference for the system illustrated in FIG. 8.

FIG. 9 shows in greater detail station set 802 of instructor terminal 801. The students in the class who are party to the video conference are displayed by name only on display 904. The instructor utilizes mouse 907 to select the view that will be seen by the students and by the instructor personally by utilizing cursor 901. To start the class, the instructor actuates start class button 905 which causes station set 802 to set up a video conference via switching system 105 and the student terminals. The instructor can determine the chair view by actuating select chair button 902 and then selecting either an individual student, the all-view picture, or an insert view. (Note, that buttons 902, 903, and 905 could be replaced by icons on display 904 which would be selected by mouse 907 using cursor 901.) The insert view is different than that previously described with respect to how the pictures are determined. In the insert view, the main picture is determine by positioning the cursor 901 next to the desired picture designation, such as VISUAL AID 911, and actuating the appropriate switch on mouse 907. If the instructor is to be shown in an insert, the cursor 901 is positioned next to INSERT INSTRUCTOR 909, and the switch on the mouse 907 is actuated. The instructor insert can be removed from the picture by positioning the cursor 901 next to INSERT INSTRUCTOR 909 and actuating the switch on mouse 907 a second time. While the cursor 901 is positioned next to INSERT STUDENT 910 entry, a student can be placed in the student insert by actuating the switch on mouse 907 and then, selecting the student entry by using the mouse. Until the cursor 901 is positioned next to INSERT STUDENT 910 entry and the switch on mouse 907 actuated a second time, the selection of an entry on the left side of display 904 by using the mouse results in the corresponding picture being placed in the student insert portion of the main picture.

Figure 10:
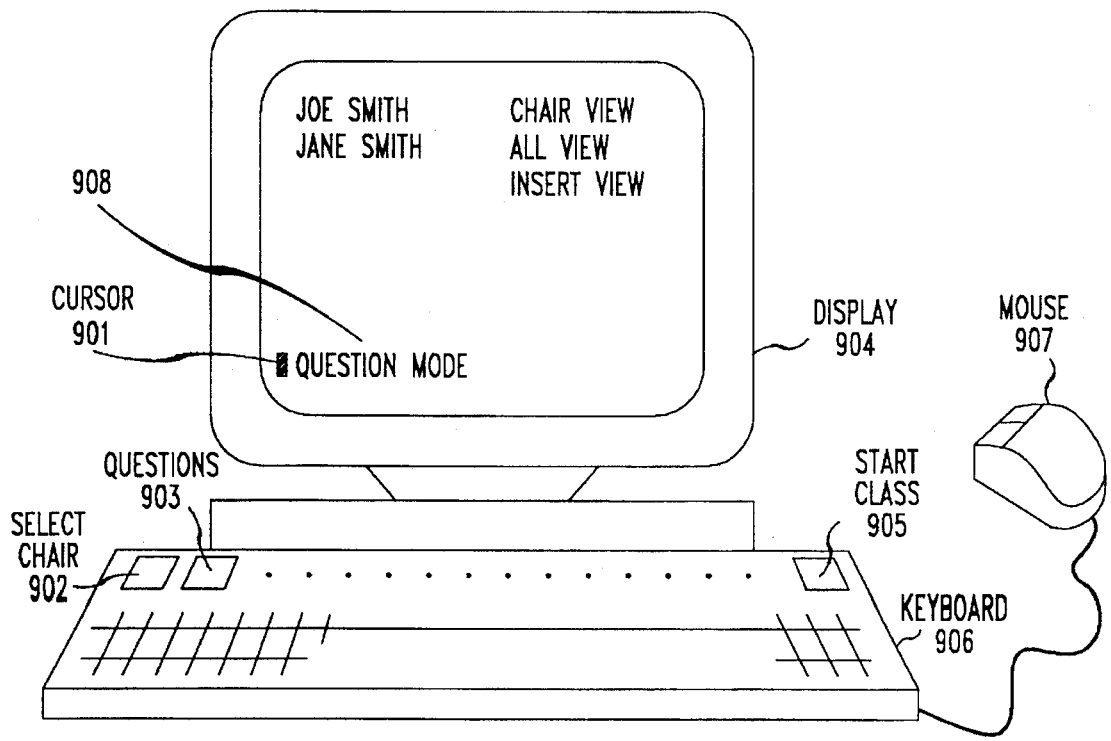

Another embodiment for handling questions from students is to utilize the question buttons on the students' station sets, such as question button 813 of station set 811 of FIG. 8. When the instructor activates questions button 903, station set 802 enters a mode whereby station set 802 is responsive to actuations of question buttons on student terminals to place the name of the student actuating the question button into a queue. The use of such queues is well known to those skilled in the art, and the queue is implemented by the terminal manager which provides stimuli to the video conference manager based on the contents of the queue. The names of the students are displayed in the order in which their requests are received. FIG. 10 illustrates station set 802 while in the questions mode and illustrates that Joe Smith and Jane Smith have activated their question buttons. The mode of the station set is displayed by the entry, "QUESTION MODE" 908. Cursor 901 is positioned next to the entry, QUESTION MODE 908. In addition, the student first in the queue (Joe Smith) is automatically placed in the student portion of the insert view. As the instructor finishes answering the question of one student, the instructor activates the appropriate switch on mouse 907 with the cursor positioned next to QUESTION MODE 908. The student next in the queue is displayed in the student insert and display 908 is automatically updated. For the present example only the name, JANE SMITH, would appear on display 908. If the instructor wishes to answer questions out of order, she/he positions cursor 901 next to that student's name and actuates the switch on mouse 907. To return to answering the questions in order, the instructor positions cursor 901 next to QUESTION MODE 908 and actuates the switch on mouse 907.

Figure 11:
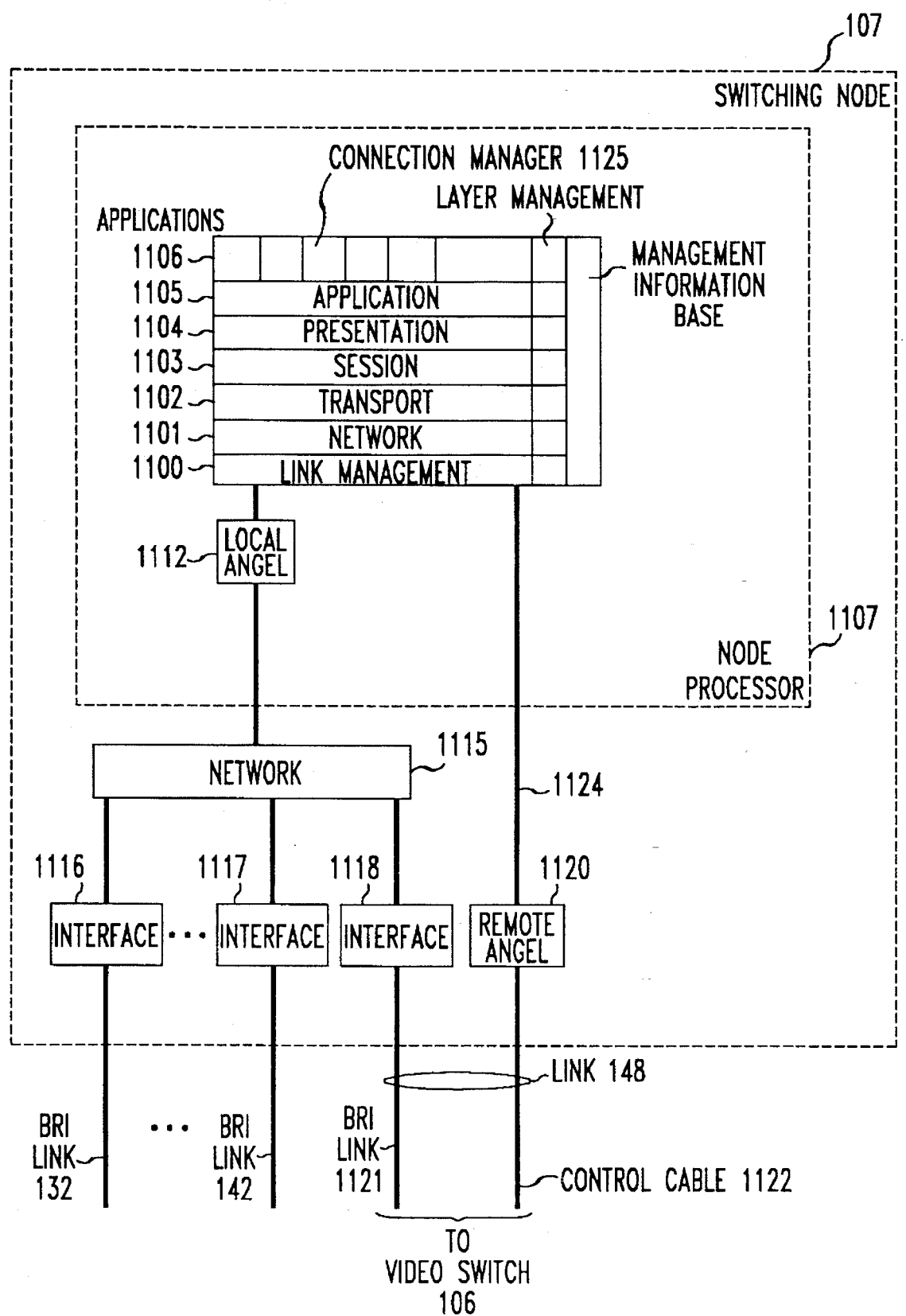
FIG. 11 illustrates, in greater detail, switching node 107 of FIG. 1.
Figure 12:
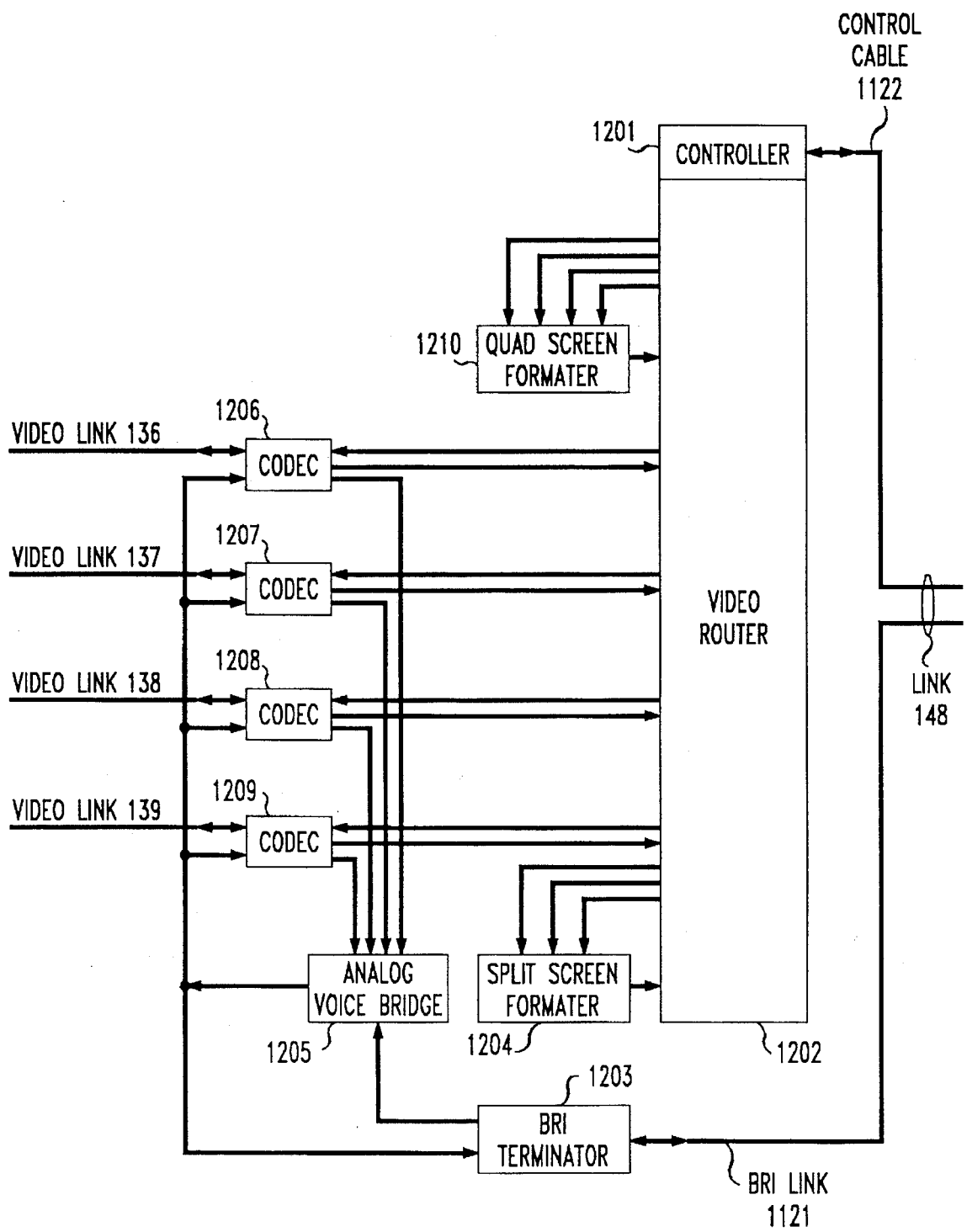
FIG. 12 illustrates, in greater detail, video switch 106 of FIG. 1.

FIGS. 11 and 12 illustrate, in greater detail, switching system 105. FIG. 11 illustrates switching node 107, and FIG. 12 illustrates video switch 106. The manner in which node processor 1107 functions with blocks 1115 through 1120 is described in detail in U.S. Pat. No. 5,182,750. Similarly, the latter patent describes the interaction between the software layers 1100 through 1106 and local angel 1112. Further, the manner in which remote angel 1120 functions with node processor 1107 over communication path 1124 is also detailed in that U.S. patent. Telephone terminals 1101 through 1104 are interconnected to switching node 107 via BRI links such as BRI link 132. Control information transmitted on these BRI links is processed through local angel 1112 before being communicated to the software layers 1100 through 1106. Video switch 106 is controlled by remote angel 1120 via link 148. Communication information between software layers 1100 through 1106 is communicated with remote angel 1120 via communication path 1124. Remote angel 1120 is responsive to this information to transmit control messages via control cable 1122 to video switch 106.

All control messages which are transmitted to switching system 105 via the BRI links of the telephone terminals are communicated to connection manager 1125 via the underlying software layers, local angel 1112, network 1115, and the appropriate interface. For example, the user information message of line 512 of FIG. 5 is transmitted from telephone terminal 101 via BRI link 132 to connection manager 1125 via the above-recited path. Connection manager 1125 is responsive to the user information message of line 512 to formulate the necessary information which is communicated to remote angel 1120 so that remote angel 1120 transmits the necessary connection information to video switch 106 via control cable 1122.

Video switch 106 is illustrated, in greater detail, in FIG. 12. Controller 1201 is responsive to connection control messages received via control cable 1122 to control video router 1202. Video and audio information are received via video links 136 through 139. Codecs 1206 through 1209 separate the video information from the audio information. The video information is transmitted to video router 1202, and the audio information is transmitted to analog voice bridge 1205. Quad screen formatter 1210 is used to format the all-view picture by accepting four video outputs from video router 1202 are from each of the four codecs. Controller 1201 controls video router 1202 to perform this switching. Split screen formatter 1204 functions in a similar manner. The resulting output picture produced by quad screen formatter 1210 or split screen formatter 1204 is transmitted to video router 1202 where under control controller 1201 this output can be sent back to any of the codecs.

Analog voice bridge 1205 receives the audio information from the codecs, combines this audio information, and transfers the combined audio information back to each codec. It is possible for a BRI station set not having been an associated video set to be pan of the audio portion of a conference. For example, station set 143 of FIG. 1 can be part of the audio portion of the conference. Node processor 1107 is responsive to control information received via BRI link 142 from station set 143 to set up network 1115 so that audio information is communicated between station set 143 and analog voice bridge 1205 via interface 1117, BRI link 142, network 1115, interface 1118, BRI link 1121, and BRI terminator 1203. Analog voice bridge 1205 receives the analog voice information from BRI terminator 1203 and combines this with the audio information received from codecs 1206 through 1209. BRI terminator 1203 receives the audio information outputted by audio voice bridge 1205, encodes this information, and transmits it via BRI link 1121, interface 1118, network 1115, interface 1117, and BRI link 142 to station set 143.

Split screen formatter 1204 is well known in the art and is described for example in U.S. Pat. No. 4,931,872. Video Router 1202 is well known in the art and maybe of the type manufactured by Hedco Inc. Analog voice bridge 1205 is also well known in the an and maybe of the type manufactured by Telelabs Inc. In addition, quad screen formatter 1210 is well known in the art and maybe of the type manufactured by For.A Inc.

Figure 13:
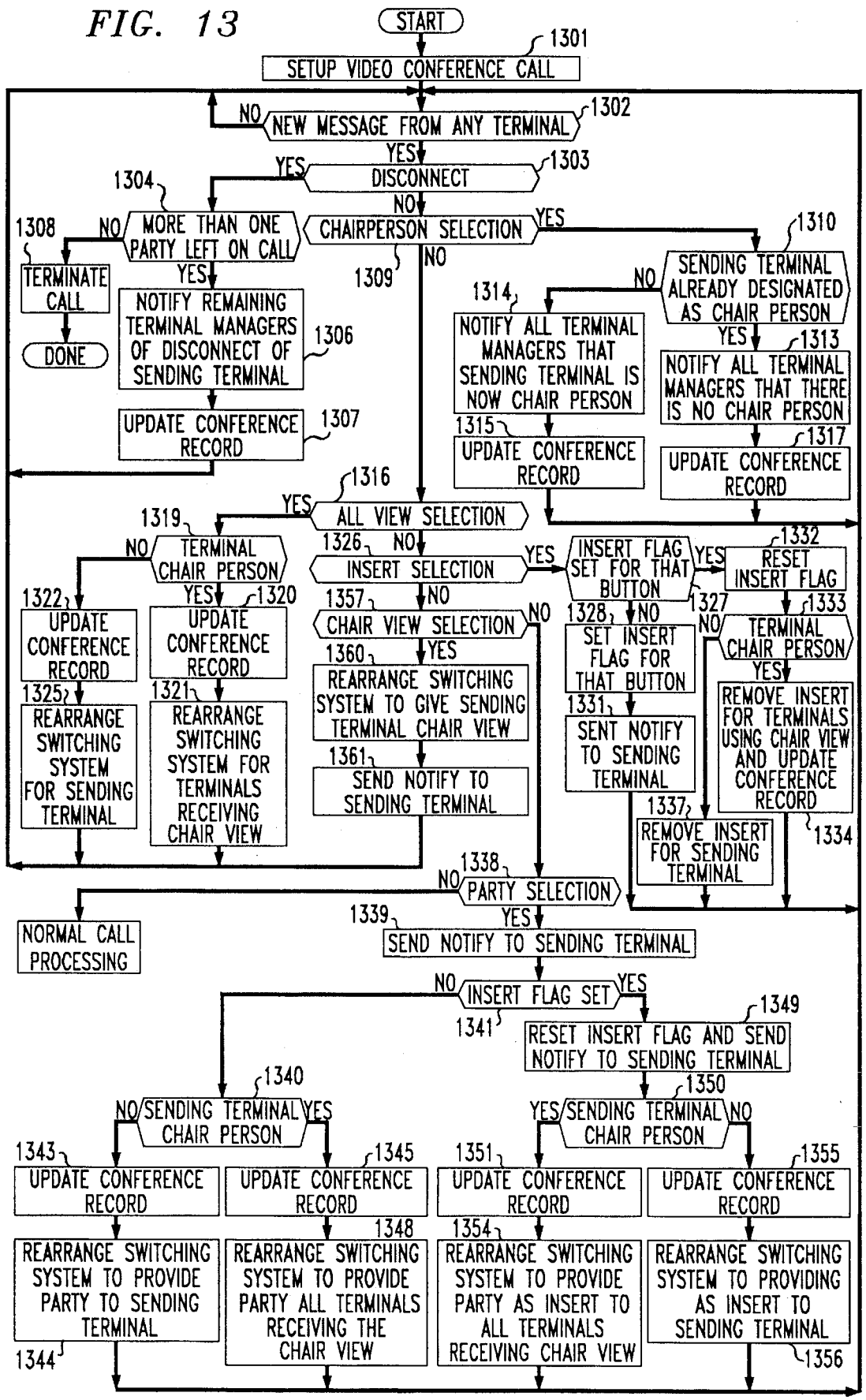
FIG. 13 illustrates, in flow chart form, the operations performed by telephone terminals controlling a video conference in accordance with the invention.

FIG. 13 illustrates, in flow chart form, the operations performed by video conference manager 304 in accordance with the invention. Block 1301 performs the functions illustrated in FIG. 2 which is to set up the video conference call. In addition, if station set 143 was to be part of the conference, block 1301 would establish the necessary paths through network 1115 of FIG. 11 and analog voice bridge 1205 of FIG. 12. Decision block 1302 determines if a new message has arrived at any of the terminals. If the answer is no, then decision block 1302 is re-executed. Decision block 1303 is invoked when terminal manager 305 receives a new message from any of the station sets including station set 120. Decision block 1303 determines whether the message is a disconnect. If the answer is yes, decision block 1304 determines if there is still more than one party left on the call. If the answer to decision block 1304 is no, block 1308 terminates the call. Returning to decision block 1304, if the answer is yes, block 1306 transmits notifying messages to the remaining terminal managers informing them that the sending terminal has disconnected. Block 1307 then updates conference record 301 to reflect that the sending terminal is no longer part of the call.

Returning to decision block 1303, if the answer is no, decision block 1309 is executed to determine whether the message is an indication of a chairperson selection from the sending terminal. If the answer is yes, decision block 1310 determines whether the sending terminal had already designated itself as a chairperson. If the answer is yes, this means that the sending terminal no longer is the chairperson, and block 1313 is executed to notify all terminal managers that there is no longer a terminal who is the chairperson. Finally, block 1317 is executed to update the conference record. Returning to decision block 1310, if the answer is no, then notify messages are transmitted to all terminal managers to notify them that the sending terminal is now the chairperson. Finally, block 1315 is executed to update the conference record. The operation of blocks 1310, 1313–1315, and 1317 allows the terminal that has become the chairperson to remain the chairperson until second chairperson selection message is received. In order for that terminal to determine a picture only for itself, the second chairperson selection message must be sent.

Returning to decision block 1309, if the answer is no, decision block 1316 is executed to determine whether the sending terminal had actuated the all-view button. If the answer is yes, control is transferred to decision block 1319 which determines whether the sending terminal is the chairperson. If the answer is yes, block 1320 updates the conference record to reflect that the chair view is now the all-view picture. By execution of block 1321, the necessary messages are then sent to the switching system to provide the all-view picture to all terminals which are receiving the chair view. Returning to decision block 1319, if the answer is no, control is transferred to block 1322 which updates the conference record to reflect that the sending terminal is now receiving the all-view picture. Finally, block 1325 is executed which transmits the necessary command to switching system 105 to provide the all-view picture to the sending telephone terminal.

Returning to decision block 1316, if the answer is no, decision block 1326 is executed to determine whether the message is an indication that one of the two insert buttons has been actuated. In the discussion of blocks 1327 through 1337, it should be understood that there is one insert flag for each insert button on each station set and that the logic illustrated in blocks 1327, 1328, 1331 through 1334 and 1337 is performed separately for each of these insert flags on each station set. If the answer to decision block 1326 is yes, control is transferred to 1327 which determines if the insert flag has already been set for that button. If the insert flag has already been set, this means that the user of the station set wants to remove the associated insert picture. Similarly, if the insert flag is not set, it means that the user wants to specify what the picture should be for this particular insert. If the answer to decision block 1327 is no, block 1328 is executed which sets the insert flag for the insert button causing the message. Block 1331 sends a notifying message back to the sending terminal to inform it that the picture to be used for the insert can now be selected. Returning to decision block 1327, if the answer is yes, block 1332 is executed which resets the insert flag and transfers control to decision block 1333. The latter decision block determines whether the sending terminal is the chairperson. If the answer is no, block 1337 is executed which removes the insert picture from only the sending terminal. However, if the answer is yes, block 1334 is executed which removes the insert picture for all terminals using the chair view and updates conference record.

Returning to decision block 1326, if the answer is no, control is transferred to decision block 1357 which determines whether the sending terminal wishes to receive the chair view. If the answer is yes, block 1360 is executed to rearrange the switching system to give the sending terminal the chair view, and block 1361 is executed to send a notifying message back to the sending terminal.

Returning to decision block 1357, if the answer is no, control is transferred to decision block 1338 which determines whether one of the party buttons had been actuated on the sending terminal. If the answer is yes, block 1339 is executed which transmits a notify message to the sending terminal verifying that the message concerning the party button had been received and control is transferred to decision block 1341. The latter block determines whether one of the insert flags has been set for either of the insert buttons. If an insert flag has been set, then the party selection is defining what picture should be in that insert. If the answer to decision block 1341 is no, control is transferred to decision block 1340 which determines whether the sending terminal is the chairperson. If the answer to this question is no, block 1343 is executed to indicate in the conference record that the sending terminal is receiving the picture of the selected party, and block 1344 is executed to send the necessary information to the switching system to provide the selected party's picture to the sending terminal. Returning to decision block 1340, if the answer is yes, block 1345 is executed to update the conference record to show that the chair view is now that of the picture of the selected party, block 1348 is executed to rearrange the switching system to provide the picture of the selected party to all terminals that are receiving the chair view.

Returning to decision block 1341, if the answer is yes, control is transferred to block 1349 which resets the insert flag and sends a notifying message to the sending terminal that indicates that the flag has been reset. Next, decision block 1350 is executed to determine whether the sending terminal is the chairperson. If the answer is yes, block 1351 is executed to update the conference record to indicate that the chair view is an insert view. Next, block 1354 is executed to rearrange the switching system to provide the picture of the party as an insert to all terminals receiving the chair view. Returning to decision block 1350, if the answer is no, block 1355 is executed to update the conference record to reflect the fact that the sending terminal is now receiving an insert view. Finally, block 1356 is executed to rearrange the switching system to provide the insert picture to the sending terminal.

In the other implementation of the chair view where the user of the telephone terminal first actuates the select chair person button and then the view button to obtain the desired picture, FIG. 13 would be modified to receive the chair person selection and picture information in the same message. In addition, for the user to select a new chair view, the video conference manager must receive again the previously mentioned message containing the select chair person and view information.

It is to be understood that the above-described embodiments are merely illustrative of the principles of the invention and that other arrangements may be devised by those skilled in the art without departing from the spirit or scope of the invention. In particular, there are many combinations of video pictures possible with the above-described embodiments such as combining the capabilities of the split screen formatter and the quad screen formatter of FIG. 12.

We claim:

1. A method for controlling a video conference between plurality of video terminals interconnected by a telecommunication switching system with each video terminal transmitting a video picture, the method comprising the steps of:

determining a chair view picture by a first one of the video terminals wherein the chair view picture is then made available to all video terminals;

requesting delivery of the chair view picture as determined by the first one of the video terminals from the telecommunication switching system by a second one of the video terminals;

requesting delivery of a first video picture from the telecommunication switching system by a third one of the video terminals;

the step of determining the chair view picture comprises the step of defining a composite of all of the video pictures transmitted to the telecommunication switching system by all of the video terminals;

the step of determining the chair view picture further comprises the step of defining a composite of the video picture from a fourth one of the video terminals inserted into the video picture from a fifth one of the video terminals;

the step of requesting a second video picture from the telecommunication switching system by the first one of the video terminals without altering the chair view video picture being received by the second one of the video terminals; and the step of requesting delivery of the chair view picture by the second one of the video terminals comprises the step of using a visual indicator device attached to the second one of the video terminals.

2. The method of claim 1 further comprises the step of determining a new chair view video picture by the third one of the video terminals wherein the new chair view video picture is transmitted to the second one of the video terminals.

3. The method of claim 1 wherein the step of requesting delivery of the chair view picture by the second one of the video terminals comprises the step of actuating a single button on the second one of the video terminals.

4. A method for controlling a video conference between plurality of video terminals interconnected by a telecommunication switching system with each video terminal transmitting a video picture and a first one of the video terminals controlling the video conference, the method comprising the steps of:

determining a chair view picture by a second one of the video terminals by transmission of first control information to the first one of the video terminals wherein the chair view picture is then made available to all video terminals from the telecommunication switching system;

requesting delivery of the chair view picture as determined by the second one of the video terminals from the telecommunication switching system by a third one of the video terminals by transmission of second control information to the first one of the video terminals by the third one of the video terminals;

requesting delivery of a first video picture from the telecommunication switching system by a fourth one of the video terminals by the fourth one of the video terminals transmitting third control information to the first one of the video terminals;

the step of determining the chair view picture comprises the step of defining a composite of all of the video pictures transmitted to the telecommunication Switching system by all of the video terminals;

the step of determining the chair view picture further comprises the step of defining a Composite of the video picture from a fifth one of the video terminals inserted into the video picture from a sixth one of the video terminals;

requesting a second video picture from the first one of the video terminals by the second one of the video terminals without altering the chair view video picture being received by the third one of the video terminals; and the step of requesting delivery of the chair view picture by the third one of the video terminals comprises the step of using a visual indicator device attached to the third one of the video terminals.

5. The method of claim 4 further comprises the step of determining another chair view video picture by the fourth one of the video terminals wherein the other chair view video picture is transmitted to the third one of the video terminals.

6. The method of claim 4 wherein the step of requesting delivery of the chair view picture by the third one of the video terminals comprises the step of actuating a single button on the third one of the video terminals.

7. The method of claim 4 wherein each of the video terminals is interconnected to the telecommunication switching system via a video link and a telecommunication link and the first, second and third control information are communicated via the telecommunication link.

8. The method of claim 7 wherein the telecommunication link is an ISDN telecommunication link.

9. A method for controlling a video conference between plurality of video terminals interconnected by a telecommunication switching system with each video terminal transmitting a video picture and one of the video terminals being a chair person video terminal, the method comprising the steps of:

determining a chair view picture by the chair person video terminal wherein the chair view picture is then made available to all video terminals;

delivering the chair view picture as determined by the chair person video terminal from the telecommunication switching system to all of the video terminals;

requesting permission of the chair person video terminal to ask a question by a user of one of the other video terminals;

inserting the video picture from the requesting one of the video terminals into the chair view picture upon permission being granted by the chair person video terminal;

the step of requesting comprises the step of lap ting the identity of the requesting one of the video terminals into a queue maintained in the chair person video terminal; and the step of inserting comprises the step of retrieving the identity of the requesting one of the video terminals from the queue to use the identity to insert the video picture from the requesting one of the video terminals into the chair view picture.

10. The method of claim 9 wherein chair person video terminal includes a display for displaying control information concerning the video conference and indicators for controlling the video conference and the step of requesting comprises the step of displaying the identity of the requesting one of the video terminals onto the display of the chair person video terminal; and the step of inserting comprises the step of responding to actuation of one of the indicators to select the identity of the requesting one of the video terminals from the display to use the identity to insert the video picture from the requesting one of the video terminals into the chair view picture.

11. The method of claim 10 wherein the indicators are switches.

12. The method of claim 11 wherein a user of chair person video terminal is an instructor and users of the video terminals are students.

13. The method of claim 10 wherein the indicators are icons on the display.

14. The method of claim 13 wherein a user of chair person video terminal is an instructor and users of the video terminals are students.

15. A method for controlling a video conference between plurality of video terminals interconnected by a telecommunication switching system with each video terminal transmitting a video picture and one of the video terminals being a chair person video terminal that is controlling the video conference, the method comprising the steps of:

determining a chair view picture by the chair person video terminal to be provided by the telecommunication switching system under control of first control information transmitted to the telecommunication switching system from the chair person video terminal wherein the chair view picture is then made available to all video terminals;

delivering the chair view picture as determined by the chair person video terminal from the telecommunication switching system to all of the video terminals;

requesting permission of the chair person video terminal to ask a question by a user of one of the other video terminals by transmission of second control information to the chair person video terminal;

inserting the video picture from the requesting one of the video terminals into the chair view picture by the telecommunication switching system under control of third control information being transmitted to the telecommunication switching system from the chair person video terminal upon permission being granted by the chair person video terminal;

the step of requesting comprises the step of placing the identity of the requesting one of the video terminals into a queue maintained in the chair person video terminal; and the step of inserting comprises the step of retrieving the identity of the requesting one of the video terminals from the queue to use the identity to generate the third control information for inserting the video picture from the requesting one of the video terminals into the chair view picture.

16. The method of claim 15 wherein the indicators are switches.

17. The method of claim 16 wherein a user of chair person video terminal is an instructor and users of the video terminals are students.

18. The method of claim 15 wherein the indicators are icons on the display.

19. The method of claim 18 wherein a user of chair person video terminal is an instructor and users of the video terminals are students.

20. The method of claim 15 wherein chair person video terminal includes a display for displaying information concerning the video conference and indicators for controlling the video conference and the step of requesting comprises the step of displaying the identity of the requesting one of the video terminals onto the display of the chair person video terminal; and the step of inserting comprises the step of responding to actuation of one of the indicators to select the identity of the requesting one of the video terminals from the display to use the identity to generate the third control information for inserting the video picture from the requesting one of the video terminals into the chair view picture.

21. The method of claim 20 wherein the indicators are switches.

22. The method of claim 21 wherein a user of chair person video terminal is an instructor and users of the video terminals are students.

23. The method of claim 20 wherein the indicators are icons on the display.

24. The method of claim 23 wherein a user of chair person video terminal is an instructor and users of the video terminals are students.

25. The method of claim 15 wherein each of the video terminals is interconnected to the telecommunication switching system via a video link and a telecommunication link and the first, second and third control information are communicated via the telecommunication link.

26. The method of claim 25 wherein the telecommunication link is an ISDN telecommunication link.

27. An apparatus for controlling a video conference between plurality of video terminals interconnected by a telecommunication switching system with each video terminal transmitting a video picture, comprising:

means for determining a chair view picture by a first one of the video terminals wherein the chair view picture is then made available to all video terminals;

means for requesting delivery of the chair view picture as determined by the first one of the video terminals from the telecommunication switching system by a second one of the video terminals;

means for requesting delivery of a first video picture from the telecommunication switching system by a third one of the video terminals;

the means for determining the chair view picture comprises means for defining a composite of all of the video pictures transmitted to the telecommunication switching system by all of the video terminals;

the means for determining the chair view picture further comprises means for defining a composite of the video picture from a fourth one of the video terminals inserted into the video picture from a fifth one of the video terminals;

means for requesting a second video picture from the telecommunication switching system by the first one of the video terminals without altering the chair view video picture being received by the second video terminal;

means for determining a new chair view video picture by the third one of the video terminals wherein the new chair view video picture is transmitted to the second one of the video terminals;

the means for requesting delivery of the chair view picture by the second one of the video terminals is responsive to actuation of a single button on the second one of the video terminals; and the means for requesting delivery of the chair view picture by the second one of the video terminals is responsive to use of a visual indicator device attached to the second one of the video terminals.

28. An apparatus for controlling a video conference between plurality of video terminals interconnected by a telecommunication switching system with each video terminal transmitting a video picture and a first one of the video terminals controlling the video conference, comprising:

means for determining a chair view picture by a second one of the video terminals by transmission of first control information to the first one of the video terminals by the second one of the video terminals wherein the chair view picture is then made available to all video terminals from the telecommunication switching system;

means for requesting delivery of the chair view picture as determined by the second one of the video terminals from the telecommunication switching system by a third one of the video terminals by transmission of second control information to the first one of the video terminals by the third one of the video terminals;

means for requesting delivery of a first video picture from the telecommunication switching system by a fourth one of the video terminals by the fourth one of the video terminals transmitting third control information to the first one of the video terminals;

the means for determining the chair view picture comprises means for defining a composite of all of the video pictures transmitted to the telecommunication switching system by all of the video terminals;

the means for determining the chair view picture further comprises means for defining a composite of the video picture from a fifth one of the video terminals inserted into the video picture from a sixth one of the video terminals;

means for requesting a second video picture from the telecommunication switching system by the second one of the video terminals without altering the chair view video picture being received by the third one of the video terminals; and the means for requesting delivery of the chair view picture by the third one of the video terminals comprises means for using a visual indicator device attached to the third one of the video terminals.

29. The apparatus of claim 28 wherein the means for requesting delivery of the chair view picture by the third one of the video terminals is responsive to actuation of a single button on the third one of the video terminals.

30. The apparatus of claim 20 further comprises means for determining another chair view video picture by the fourth one of the video terminals wherein the other chair view video picture is transmitted to the third one of the video terminals.

31. The apparatus of claim 30 wherein each of the video terminals is interconnected to the telecommunication switching system via a video link and a telecommunication link and the first, second and third control information are communicated via the telecommunication link.

32. The apparatus of claim 31 wherein the telecommunication link is an ISDN telecommunication link.

33. An apparatus for controlling a video conference between plurality of video terminals interconnected by a telecommunication switching system with each video terminal transmitting a video picture and one of the video terminals being a chair person video terminal, comprising:

means for determining a chair view picture by the chair person video terminal wherein the chair view picture is then made available to all video terminals;

means for delivering the chair view picture as determined by the chair person video terminal from the telecommunication switching system to all of the video terminals;

means for requesting permission of the chair person video terminal to ask a question by a user of one of the other video terminals;

means for inserting the video picture from the requesting one of the video terminals into the chair view picture upon permission being granted by the chair person video terminal;

the means for requesting crises means for placing the identity of the requesting one of the video terminals into a queue maintained in the chair person video terminal; and the means for inserting comprises means for retrieving the identity of the requesting one of the video terminals from the queue to use the identity to insert the video picture from the requesting one of the video terminals into the chair view picture.

34. The apparatus of claim 33 wherein chair person video terminal includes a display for displaying control information concerning the video conference and indicators for controlling the video conference and the means for requesting comprises means for displaying the identity of the requesting one of the video terminals onto the display of the chair person video terminal; and the means for inserting comprises means for responding to actuation of one of the indicators to select the identity of the requesting one of the video terminals from the display to use the identity to insert the video picture from the requesting one of the video terminals into the chair view picture.

35. The apparatus of claim 34 wherein the indicators are switches.

36. The apparatus of claim 35 wherein a user of chair person video terminal is an instructor and users of the video terminals are students.

37. The apparatus of claim 34 wherein the indicators are icons on the display.

38. The apparatus of claim 37 wherein a user of chair person video terminal is an instructor and users of the video terminals are students.

39. An apparatus for controlling a video conference between plurality of video terminals interconnected by a telecommunication switching system with each video terminal transmitting a video picture and one of the video terminals being a chair person video terminal that is controlling the video conference, comprising:

means for determining a chair view picture by the chair person video terminal to be provided by the telecommunication switching system under control of first control information transmitted to the telecommunication switching system from the chair person video terminal wherein the chair view picture is then made available to all video terminals;

means for delivering the chair view picture as determined by the chair person video terminal from the telecommunication switching system to all of the video terminals;

means for requesting permission of the chair person video terminal to ask a question by a user of one of the other video terminals by transmission of second control information to the chair person video terminal;

means for inserting the video picture from the requesting one of the video terminals into the chair view picture by the telecommunication switching system under control of third control information being transmitted to the telecommunication switching system from the chair person video terminal upon permission being granted by the chair person video terminal;

the means for requesting comprises means for placing the identity of the requesting one of the video terminals into a queue maintained in the chair person video terminal; and the means for inserting comprises means for retrieving the identity of the requesting one of the video terminals from the queue to use the identity to generate the third control information for inserting the video picture from the requesting one of the video terminals into the chair view picture.

40. The apparatus of claim 39 wherein the indicators are switches.

41. The apparatus of claim 40 wherein a user of chair person video terminal is an instructor and users of the video terminals are students.

42. The apparatus of claim 39 wherein the indicators are icons on the display.

43. The apparatus of claim 42 wherein a user of chair person video terminal is an instructor and users of the video terminals are students.

44. The apparatus of claim 39 wherein chair person video terminal includes a display for displaying information concerning the video conference and indicators for controlling the video conference and the means for requesting comprises means for displaying the identity of the requesting one of the video terminals onto the display of the chair person video terminal; and the means for inserting comprises means for responding to actuation of one of the indicators to select the identity of the requesting one of the video terminals from the display to use the identity to generate the third control information for inserting the video picture from the requesting one of the video terminals into the chair view picture.

45. The apparatus of claim 44 wherein the indicators are switches.

46. The apparatus of claim 45 wherein a user of chair person video terminal is an instructor and users of the video terminals are students.

47. The apparatus of claim 44 wherein the indicators are icons on the display.

48. The apparatus of claim 47 wherein a user of chair person video terminal is an instructor and users of the video terminals are students.

49. The apparatus of claim 39 wherein each of the video terminals is interconnected to the telecommunication switching system via a video link and a telecommunication link and the first, second and third control information are communicated via the telecommunication link.

50. The apparatus of claim 49 wherein the telecommunication link is an ISDN telecommunication link.

* * * * *